Nov. 12, 1968  TATSUO KANEKO  3,410,187
AUTOMATIC FILM SENSITIVITY SETTING MEANS FOR AN
EXPOSURE CONTROL CIRCUIT OF A CAMERA
Filed Feb. 19, 1965  3 Sheets-Sheet 2

INVENTOR.
TATSUO KANEKO
BY
Buckman and Archer
HIS ATTORNEYS

United States Patent Office 3,410,187
Patented Nov. 12, 1968

3,410,187
AUTOMATIC FILM SENSITIVITY SETTING MEANS FOR AN EXPOSURE CONTROL CIRCUIT OF A CAMERA
Tatsuo Kaneko, Yono-shi, Japan, assignor to Fuji Shashin Film Kabushiki Kaisha and Fuji Shashin Koki Kabushiki, Ashigarakami-gun, Saitama-ken, Japan, both corporations of Japan
Filed Feb. 19, 1965, Ser. No. 434,068
7 Claims. (Cl. 95—10)

ABSTRACT OF THE DISCLOSURE

An improved camera for use with film magazines wherein the sensitivity of the film is represented by a slot on the magazine, the camera including unique mechanical sensing means and a mechanism whereby the sensing means is actuated when the camera cover is locked in order to automatically adjust the camera to function with the particular film.

Figure 1:
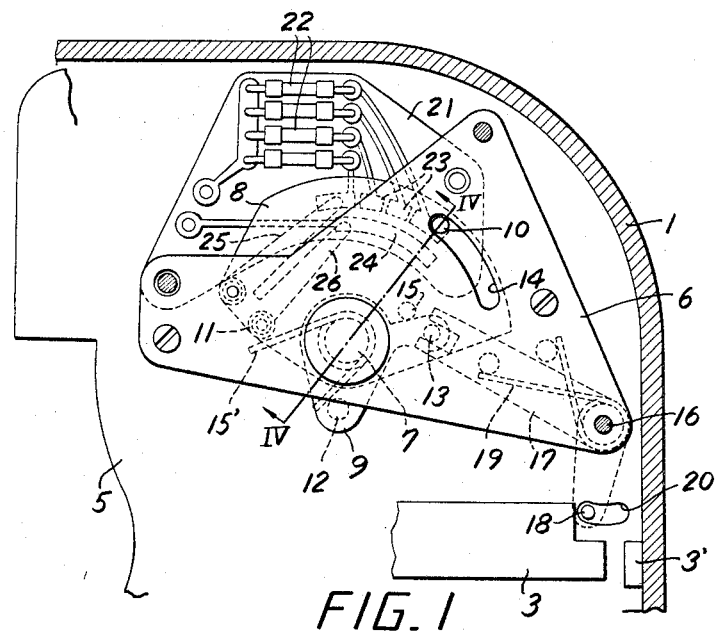

The present invention relates to an automatic film sensitivity setting means for a camera using a film magazine, and particularly to such means suitable for a small movie camera with an automatic exposure control means. More particularly, the present invention relates to an automatic film sensitivity setting means which, in response to locking of the camera cover in closed position following the charging of a film magazine, serves to adjust the exposure control circuit of the camera automatically in accordance with film sensitivity (such as "ASA" value or "DIN" value).

Hithertofore, it has been proposed to provide a limit portion on the film magazine which, during charging of the magazine in a camera or closing of the camera cover after charging, cooperates with a movable mechanism provided on the camera and serves to set film sensitivity automatically.

However, these prior mechanisms have some disadvantages. For example, since nonuniform force is applied during charging of the magazine, handling procedures are different for each operator, or charging pressure is limited for plastic magazine, the resultant setting becomes unstable.

Further, for the exposure control circuit where the setting is performed through switching of the electric resistance thereof by mechanical means, since only limited actuating force is obtainable by the above described prior art, the resultant setting becomes more unstable.

Accordingly, the present invention has an object to overcome such problems and to provide a positive means which serves to set film sensitivity automatically in the exposure control circuit of the camera.

In accordance with the present invention, an automatic film sensitivity setting means is provided which utilizes, as in the ordinary mechanism, a film magazine with a limit portion representing film sensitivity, but which serves to perform the setting neither during magazine charging nor during closing of the camera cover after charging but during locking of the camera cover. Thus, in the present invention, the locking mechanism provided on the camera cover is so related to a movable piece of the automatic setting means that, in response to locking of the cover after charging of the magazine, the movable piece is actuated to obtain desired settings.

The automatic film sensitivity setting means in accordance with the present invention comprises a limit portion provided on the film magazine and corresponding to film sensitivity, a movable element adapted to engage with said limit portion, and a means for adjustment of the exposure control circuit of the camera in accordance with the movement of said movable element, characterized in that said movable element is arranged to be moveable in response to locking of the camera cover in closed position and to be limited in its movement at a position corresponding to the film sensitivity by means of said limit portion.

Figure 2:
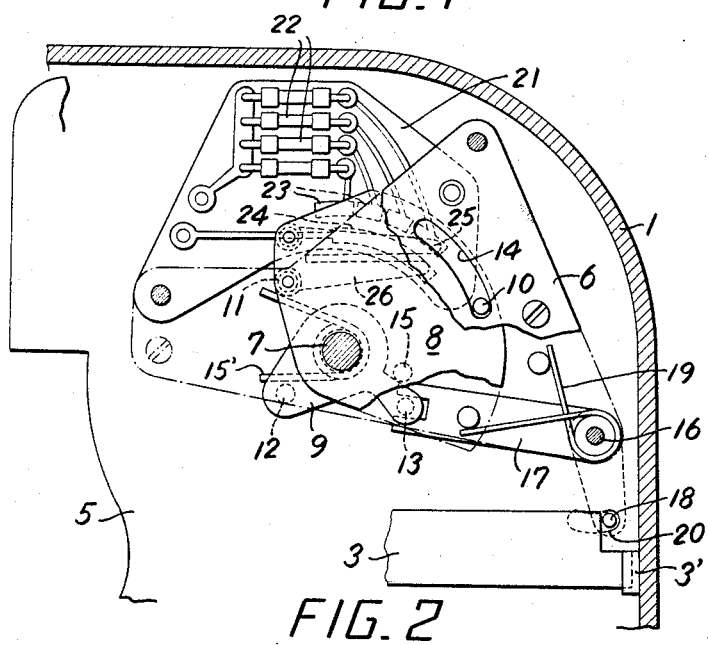
Figure 4:
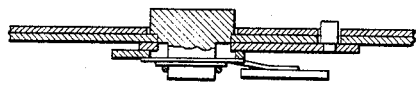
Figure 3:
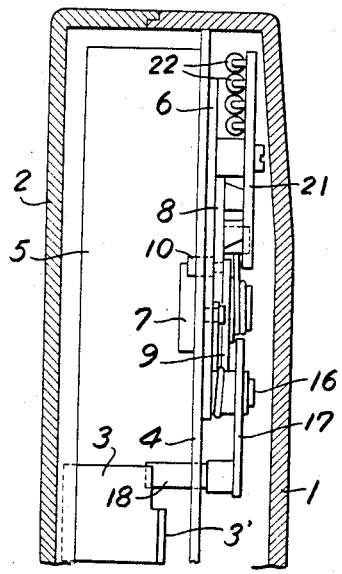
Figure 5A:
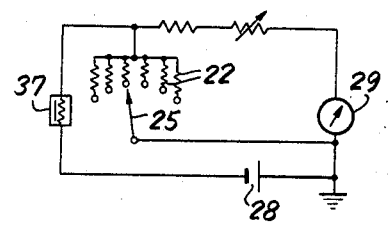
Figure 5B:
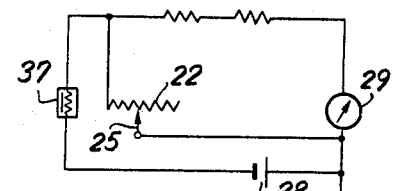
Figure 7:
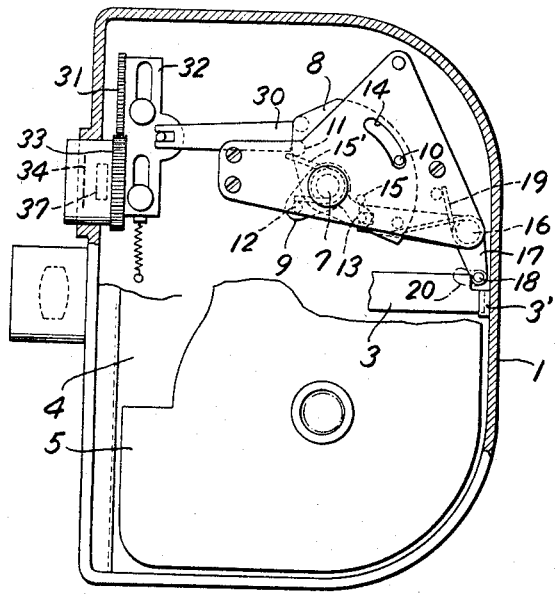
Figure 8:
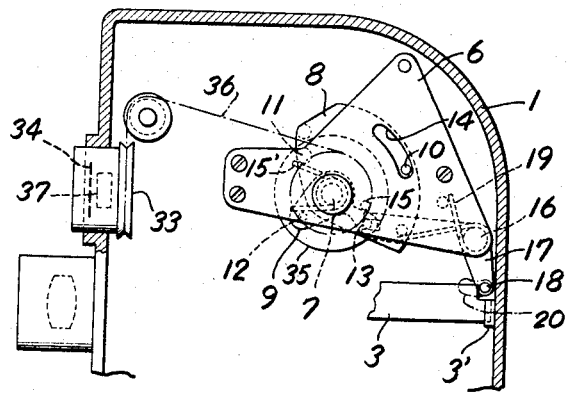

In order that the present invention may be more clearly understood and readily carried into effect, reference may now be had to the accompanying drawings in which several forms of the present invention are illustrated by way of example, and in which:

FIG. 1 is an elevational view of the interior of the camera prior to locking of the cover;
FIG. 2 is also an elevational view of the interior of the camera shown in FIG. 1 with all parts in actuated position;
FIG. 3 is a cross-sectional view of the camera shown in FIGS. 1 and 2;
FIG. 4 is a cross-sectional view taken along the line IV—IV of FIG. 1;
FIG. 5a and 5b are the circuit diagrams suitable for use with the mechanism shown in FIGS. 1 and 2;
FIGS. 6a through 6d are perspective views of the film magazines each of which has a suitable limit portion corresponding to the film sensitivity;
FIG. 7 is an elevational view of another embodiment with all parts in actuated position; and
FIG. 8 shows a modification of the mechanism shown in FIG. 7.

Referring now to the drawings, particularly to FIGS. 1 and 3, the numeral 1 shows the camera casing, 2 shows the cover, 3 shows the latch which locks the cover 2 in completely closed position, and 4 shows the inner wall plate which defines the boundary of the chamber for the magazine 5.

In FIG. 1, which is an elevational view with the wall plate 4 removed, a setting plate 8 and a lever 9 are shown as rotatably secured on the shaft 7 which is provided on the base plate 6 fixed to the wall plate 4. The setting plate 8 has a movable element 10 which projects through the elongated slots 14 formed in the base plate 6 and the wall plate 4. Also, the plate 8 is provided with two pins 11 and 15 and the lever 9 has two pins 12 and 13. A spring 15' is coiled around the shaft 7 and interposed between the pins 11 and 12 to bias the setting plate 8 and the lever 9 to rotate in different directions to each other until the lever 9 engages with the pin 15 on the setting plate 8. The pin 13 engages with the fork end of an arm 17 which is pivoted at the point 16 and rotatably biased by a spring 19. The arm 17 has a pin 18 at the other end which projects through the slot 20 in the wall plate 4 into the magazine chamber at a position engageable with the latch 3 of the cover 2.

The electric panel 21 comprises a plurality of resistors 22, a plurality of contacts 23 which correspond one to each resistor, and a contact 24 which is connected to the opposite terminal. These contacts 23 and 24 contact with the electric slide elements 25 and 26 respectively. The magazine 5 has a limit portion 27 which is located to be disposed at a position to align with said elongated slot 14. The limiting engage portion 27 can be, for example, a groove shown in FIGS. 6a through 6c or a projection 27 shown in FIG. 6d, the length or position of which is determined in accordance with film sensitivity.

Figure 6A:
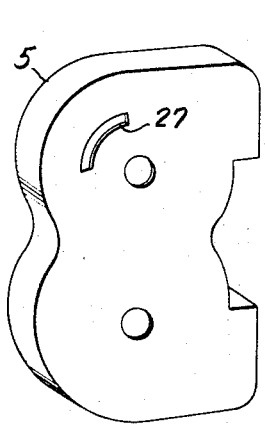
Figure 6B:
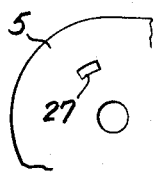

When the magazine 5 shown in FIG. 6a is disposed in the camera with all parts in the position of FIG. 1, the limit portion 27 aligns with the passage of the movable element 10.

Figures 6C, 6D:
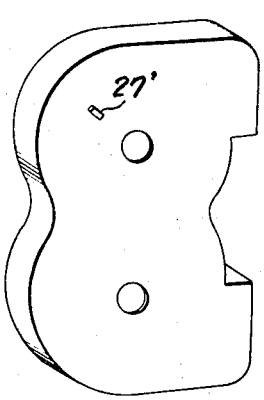

Thus, when the cover 2 is closed and the latch 3 is engaged with the adapter 3' to prevent opening of the cover 2, the pin 18 is moved by the latch 3 rotating the arm 17 counterclockwise, whereby the lever 9 is rotated clockwise. Then the setting plate 8 is rotated, by the action of the spring 15', in the same direction as the lever 9 until the slide elements 25 and 26 reach to the right hand end of the contacts 23 and 24 respectively and the movable element 10 engages with the portion 27 to prevent further rotation of the plate 8. If the magazine shown in FIG. 6c is used, the movement of the movable element 10 is limited to a small extent by the portion 27 and further rotation of the lever 9 causes deflection of the spring 15', thus the slide element 25 completes the circuit at the appropriate position of the contact 23.

The resistor or resistors 22 can be either as shown in FIG. 5a or 5b, i.e., a plurality of fixed resistors or a continuously variable resistor by means of which proper resistance can be inserted in parallel across the photoelectric panel 37 such as selenium cell or CdS cell and the battery 28 and in parallel with ammeter 29, in accordance with "ASA" value.

FIG. 7 shows another embodiment of the present invention of which mechanism is the same as the above-mentioned embodiment. However, all electrical parts such as the electric resistors and the contacts are omitted in this embodiment, and the setting plate 8 is extended to form the arm 30. The fork end of the arm 30 engages with the slide 32 which is provided with a rack portion 31. The rack portion 31 engages with the exposure control means 33 such as a toothed gear cooperating with the iris 34 of the photoelectric panel 37 such as a selenium cell or a CdS cell.

FIG. 8 shows a modification of FIG. 7, in which a wire pulley 35 is secured on the setting plate 8 to rotate therewith, and the wire 36 is wound, at the other hand, around the exposure control means 33 of photoelectric panel 37.

In the embodiments of FIGS. 7 and 8, the exposure control means 33 is spring biased and the iris 34 is full open when the cover is unlocked. However, when a magazine such as the magazine shown in FIG. 6a is charged and the cover 2 is locked in closed position, the arm 30 or the wire 36 is moved to actuate the exposure control means 33. Thus, the extent of exposure of the photoelectric panel 37 is automatically adjusted in accordance with the film sensitivity.

As apparent from above description, the present invention provides a means by which, in response to locking of the camera cover after charging of the magazine, the exposure control circuit of the camera can be automatically adjusted in accordance with the film sensitivity.

The details of the structure may be modified substantially without departing from the spirit of the invention and exclusive use of such modifications as come within the scope of appended claims is contemplated.

What is claimed is:

1. An improved camera for use with film magazines having a slot representative of the sensitivity of the film therein, including a movable element adapted to be coupled to said slot, exposure control elements in said camera, and means for adjustment of said exposure control elements in accordance with the movement of said movable element, said movable element being mounted and biased for rotation about an axis substantially orthogonal to the plane in which the slot is disposed, and a lever engaging said movable element and coupled to prevent rotation thereof, said improvement comprising holding means coupled to said lever to prevent rotation of said lever, a latch for securing the cover of the camera in a closed position, and means operative upon engagement of said latch for releasing said holding means to permit rotation of said lever which in turn permits rotation of said movable element.

2. A camera according to claim 1, wherein said lever is rotatable about an axis substantially orthogonal to the plane in which said slot is disposed, said holding means is rotatable about an axis substantially orthogonal to the plane in which said slot is disposed, and said latch is tangentially movable relative to said axis of said holding means.

3. A camera according to claim 1, wherein the slot on the film magazine is a groove of length corresponding to film sensitivity, and said movable element has a projection for slidable engagement with said groove.

4. A camera according to claim 1, wherein said holding means comprises an arm which is engageable with the cover locking means and rotatable in response to locking of said cover.

5. A camera according to claim 1, wherein said exposure control elements include a variable resistance circuit, and said movable element comprises a means which selectively varies electric resistance in accordance with the movement of said movable element.

6. A camera according to claim 1, wherein said exposure control elements include a photosensitive element and control means for controlling the exposure sensitivity thereof, and said movable element comprises mechanical means which modify said control means in accordance with the amount of rotation of said movable element.

7. A camera according to claim 6, wherein an iris controls the exposure of said photosensitive element and said mechanical means includes a rack and pinion mechanism which operates in response to the movement of said movable element to control the iris of said photoelectric panel.

References Cited

UNITED STATES PATENTS

| | | | |
|---|---|---|---|
| 2,043,901 | 6/1936 | Mihalyi | 95—10 X |
| 2,186,613 | 1/1940 | Mihalyi | 95—10 X |
| 3,125,939 | 3/1964 | Bundschuh et al. | 95—10 |
| 3,194,132 | 7/1965 | Nerwin | 95—10 |
| 3,194,133 | 7/1965 | Benson | 95—10 X |
| 3,266,395 | 8/1966 | Kremp et al. | 95—10 |
| 3,266,398 | 8/1966 | Kremp et al. | 95—10 X |

NORTON ANSHER, *Primary Examiner.*

JOSEPH F. PETERS, JR., *Assistant Examiner.*